May 12, 1925.
A. C. DU VALL
1,537,592
DETACHABLE SPUR FOR WHEELS
Filed Feb. 7, 1925
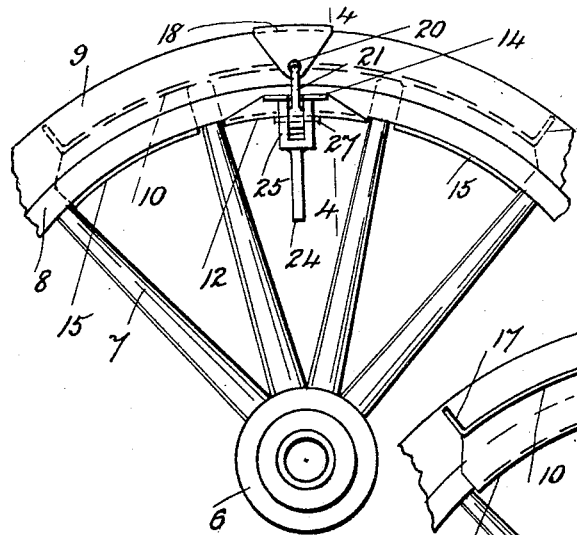
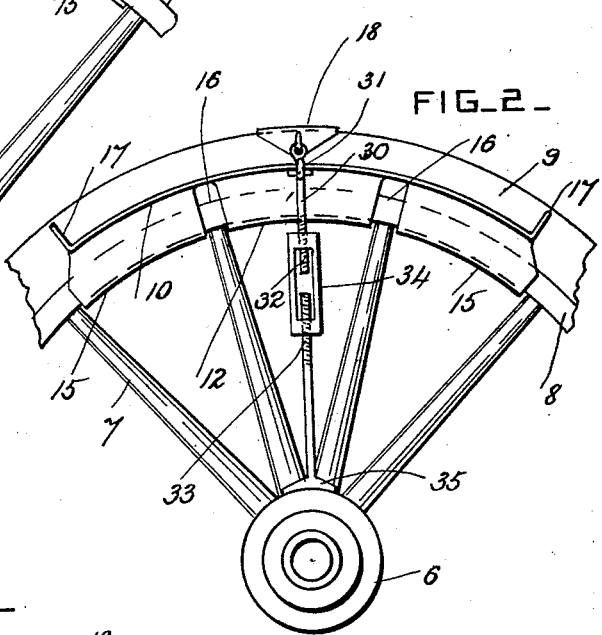
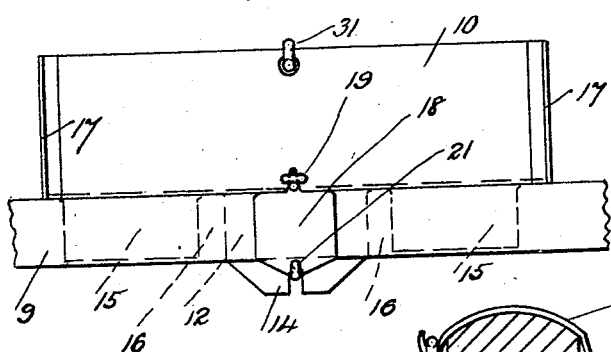
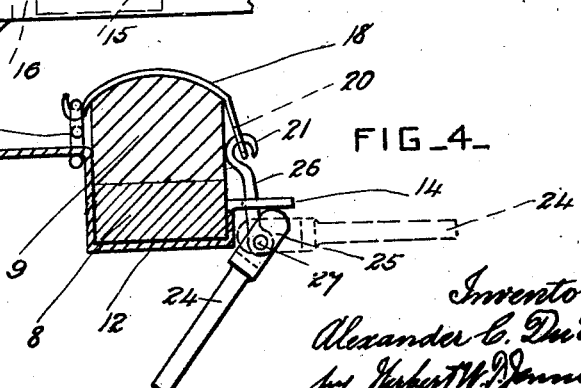
Inventor.
Alexander C. DuVall.
by Herbert W. Jenner
Attorney.

Patented May 12, 1925.

1,537,592

UNITED STATES PATENT OFFICE.

ALEXANDER C. DU VALL, OF OXFORD, OHIO.

DETACHABLE SPUR FOR WHEELS.

Application filed February 7, 1925. Serial No. 7,610.

*To all whom it may concern:*

Be it known that I, ALEXANDER C. DU VALL, a citizen of the United States, residing at Oxford, in the county of Butler and State of Ohio, have invented certain new and useful Improvements in Detachable Spurs for Wheels, of which the following is a specification.

This invention relates to detachable spurs or extension pieces adapted to be attached to the rims of the road wheels of motor cars and other vehicles to enable them to get out of or pass over soft muddy spots in the road; and it consists in the novel construction and combination of the parts hereinafter fully described and claimed.

In the drawings, Figure 1 is a front view of a portion of a wheel provided with an attachment according to this invention. Fig. 2 is a rear view of the same. Fig. 3 is a plan view of the same. Fig. 4 is a cross-section, taken on the line 4—4 in Fig. 1, and is drawn to a larger scale.

The wheel is of any approved construction used on motor cars and other vehicles, and has a hub 6, spokes 7, a rim 8 and a tire 9.

A curved tread plate 10 is provided, and is clamped to the rim of the wheel. This plate has a channel-shaped member 12 on one side edge and at the middle of its length, which fits under the rim of the wheel between two adjacent spokes, and this part 12 has a laterally projecting forked lug 14 at the middle part of its front edge. The tread plate 10 has also hooked-shaped members 15 on its end portions which fit under the rim between adjacent spokes, spaces 16 being formed between the ends of the two members 15 and the channel-shaped member 12 to clear the spokes.

The tread plate 10 is secured to the wheel rim so that it projects laterally on one side of it, and it has spurs or lugs 17 at its ends which are substantially radial of the axis of the wheel and which project outwardly.

The plate 10 is clamped to the wheel rim by a curved arm or strap plate 18 of resilient metal which extends over the tire. The inner end portion of the arm 18 is pivotally connected with the plate 10 by means of a link 19. The outer end portion of the arm 18 has a hole 20, and a link or hook 21 is pivoted in this hole and is disengageable from it. A fastening lever 24 is provided and has a forked cam-shaped head or end portion 25. The shank 26 of the hook 21 is adapted to be slipped into engagement with the forked lug 14, and it is pivoted to the head 25 by a pin 27. When the parts are in the positions shown in Fig. 4, the head on the lever 24 locks the arm 18 and the tread plate 10 securely to the rim of the wheel. The arm and tread plate are detached from the rim by first moving the lever to the position shown by dotted lines in Fig. 4, so that the cam-shaped head no longer bears against the underside of the forked lug. This permits the link or hook 21 to be slid out of engagement with the forked lug, so that the arm 18 can be turned clear of the wheel rim.

When this device is used on the wheels of a heavy truck an extensible strut 30 is preferably arranged between the tread plate 10 and the hub of the wheel, on the opposite side of the wheel from the arm and fastening lever. This strut is preferably connected pivotally to the plate 10 by a hook 31, and is formed in two parts provided with right and left screwthreaded shanks 32 and 33. These shanks are connected by a turnbuckle 34. The outer shank 32 has the hook 31 on it, and the inner shank 33 has a curved abutment plate or piece 35 which engages with the hub and prevents the strut from slipping off it.

The turnbuckle is revolved to extend the strut so that the tread plate is pressed away from the hub, and is prevented from being bent out of shape by contact with the ground.

This device is intended for use on soft ground and in mud holes, and is not intended for use on paved streets. It can however be left on the wheel, if desired, on a country road, as when the road is firm and hard the tread plate does not bear on its surface. This device may be clamped upon any convenient projecting portion of the wheel when the wheel is in a mud hole, and then when the car is started the tread plate comes against the ground as the wheel revolves, and lifts the wheel out of the mud hole. More than one of these devices can be clamped to the wheel rim if desired.

What I claim is:

1. An extension piece for a wheel, comprising a curved tread plate having a channel-shaped member on one side edge adapted to fit under a wheel rim between two spokes and provided with a projecting lug, an arm pivoted to the said plate and adapted to extend over the wheel rim, and a fastening lever pivotally connected with the free end portion of the said arm and provided with a cam-shaped head adapted to engage with the said lug and operating to clamp the tread plate to the wheel rim.

2. An extension piece for a wheel, comprising a curved tread plate having a channel-shaped member on one side edge at the middle part of its length adapted to fit under a wheel rim between two adjacent spokes and provided with a projecting lug, said plate having also hook-shaped members on its end portions which also are adapted to fit under the wheel rim on the other side of the spokes from the first said member, an arm pivoted to the said plate and adapted to extend over the wheel rim, and a fastening lever pivotally connected with the free end portion of the said arm and provided with a cam-shaped head adapted to engage with the said lug and operating to clamp the tread plate to the wheel rim.

3. An extension piece for a wheel, comprising a curved tread plate having a channel-shaped member on one side edge provided with a forked projecting lug, an arm pivoted to the said plate at one end, a link pivoted to the free end portion of the arm and adapted to engage with the forked lug, and a fastening lever provided with a cam-shaped head pivoted to the said link and adapted to bear on the said lug.

4. An extension piece for a wheel as set forth in claim 3, the said arm being pivotally connected with the curved plate by means of a link.

5. An extension piece for a wheel as set forth in claim 3, the said link being pivoted to the fastening lever at one end and having a hook at its other end which engages pivotally with a hole in the free end portion of the said arm.

6. The combination, with an extension piece for a wheel as set forth in claim 1, of an extensible strut provided at one end with means for engaging with the curved tread plate on the other side thereof from the said arm, and having at its other end an abutment piece for bearing on the wheel hub.

In testimony whereof I have affixed my signature.

ALEXANDER C. DU VALL.